US010241674B2

(12) United States Patent
Eshwarappa et al.

(10) Patent No.: US 10,241,674 B2
(45) Date of Patent: Mar. 26, 2019

(54) WORKLOAD AWARE NUMA SCHEDULING

(71) Applicant: VMWARE, INC., Palo Alto, CA (US)

(72) Inventors: Kiran Eshwarappa, Bangalore (IN); Vinaya Hanumantharaya, Bangalore (IN); Selventhiran Elangovan, Bangalore (IN); Gangam Kushalappa, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 312 days.

(21) Appl. No.: 15/191,601

(22) Filed: Jun. 24, 2016

(65) Prior Publication Data
US 2017/0168715 A1 Jun. 15, 2017

(30) Foreign Application Priority Data

Dec. 11, 2015 (IN) ............................ 6625/CHE/2015

(51) Int. Cl.
*G06F 12/00* (2006.01)
*G06F 3/06* (2006.01)
*G06F 9/455* (2018.01)

(52) U.S. Cl.
CPC .......... *G06F 3/0604* (2013.01); *G06F 3/0647* (2013.01); *G06F 3/0664* (2013.01); *G06F 3/0673* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| 8,307,192 | B2 | 11/2012 | Pandey et al. |
| 2010/0251234 | A1* | 9/2010 | Oshins ................ G06F 9/4856 718/1 |
| 2013/0232500 | A1 | 9/2013 | Zaroo et al. |
| 2015/0277779 | A1* | 10/2015 | Devarapalli ........ G06F 9/45558 711/162 |

OTHER PUBLICATIONS

Andi Kleen, "numactl—Control NUMA policy for processes or shared memory" "nomactl(6)—Linux man page", http://linux.die.net/man/8/nurnactl, 2004, v.2, pp. 1-4.
"Using NUMA Systems with ESXi." vSphere Resource Management ESXi 5.1 vCenter Server 5,1, pp. 120-139, VMware, Inc., 2012.

* cited by examiner

*Primary Examiner* — Baboucarr Faal
(74) *Attorney, Agent, or Firm* — Patterson + Sheridan LLP

(57) ABSTRACT

Disclosed herein are techniques for performing workflow-aware NUMA (non-uniform memory access) optimizations. "Execution contexts" such as virtual machines or Docker containers are managed within a computer system that includes multiple NUMA nodes, each including a processor socket and memory local to that socket. NUMA optimization techniques are performed whereby execution contexts and/or data for such contexts are migrated between NUMA nodes. Migration may occur for various reasons, including for load balancing, to achieve fairness, or to increase the amount of data that is stored in memory local to a particular execution context. When it is known that an execution context will soon stop executing in a particular computer system, optimizations may provide little or no benefit. In such situations, the computer system performs modified NUMA optimizations, in which certain optimizations that would normally be performed are instead not performed.

20 Claims, 4 Drawing Sheets

WORKLOAD AWARE NUMA SCHEDULING

RELATED APPLICATIONS

Benefit is claimed under 35 U.S.C. 119(a)-(d) to Foreign application Serial No. 6625/CHE/2015 filed in India entitled "WORKLOAD AWARE NUMA SCHEDULING", on Dec. 11, 2015, by VMware, Inc., which is herein incorporated in its entirety by reference for all purposes.

BACKGROUND

Virtual machines (or other execution contexts such as Docker Containers (see, e.g., www.docker.com)) are often executed by complex server hardware with multiple processor sockets. Such systems may be referred to as "NUMA" systems (where NUMA stands for "non-uniform memory access"), as each processor socket has its own local memory that provides quicker access to work executing in the same socket, but is still accessible, though less quickly, to work executing in a different socket. A combination of a processor socket and associated local memory is referred to as a "NUMA node."

While the presence of multiple NUMA nodes in a particular system increases the processing capacity of that computer system, the existence of multiple NUMA nodes also increases the complexity of workload scheduling. Such complexity arises from the fact that the choice of which NUMA node to execute a particular execution context may be dependent on various factors such as current CPU load at the different NUMA nodes, the NUMA node(s) in which data used by a particular execution context is stored, and other factors.

SUMMARY

Embodiments of the present disclosure provide a method for managing virtual machines in a non-uniform memory access (NUMA) architecture. The method includes identifying a first execution context for optimization analysis. The method also includes determining that no workflow aware-related trigger condition of a set of workflow aware-related trigger conditions has occurred for the first execution context. The method further includes performing a NUMA optimization operation for the first execution context. The method also includes identifying a second execution context for optimization analysis. The method further includes determining that a workflow aware-related trigger condition of the set of workflow aware-related trigger conditions has occurred for the second execution context. The method also includes responsive to determining that the workflow aware-related trigger condition has occurred, performing a modified NUMA optimization operation for the second execution context. The NUMA optimization operation includes at least one operation not included in the modified NUMA optimization operation.

Further embodiments include a non-transitory computer-readable storage medium storing instructions that cause a computer to carry out the above method and a system.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
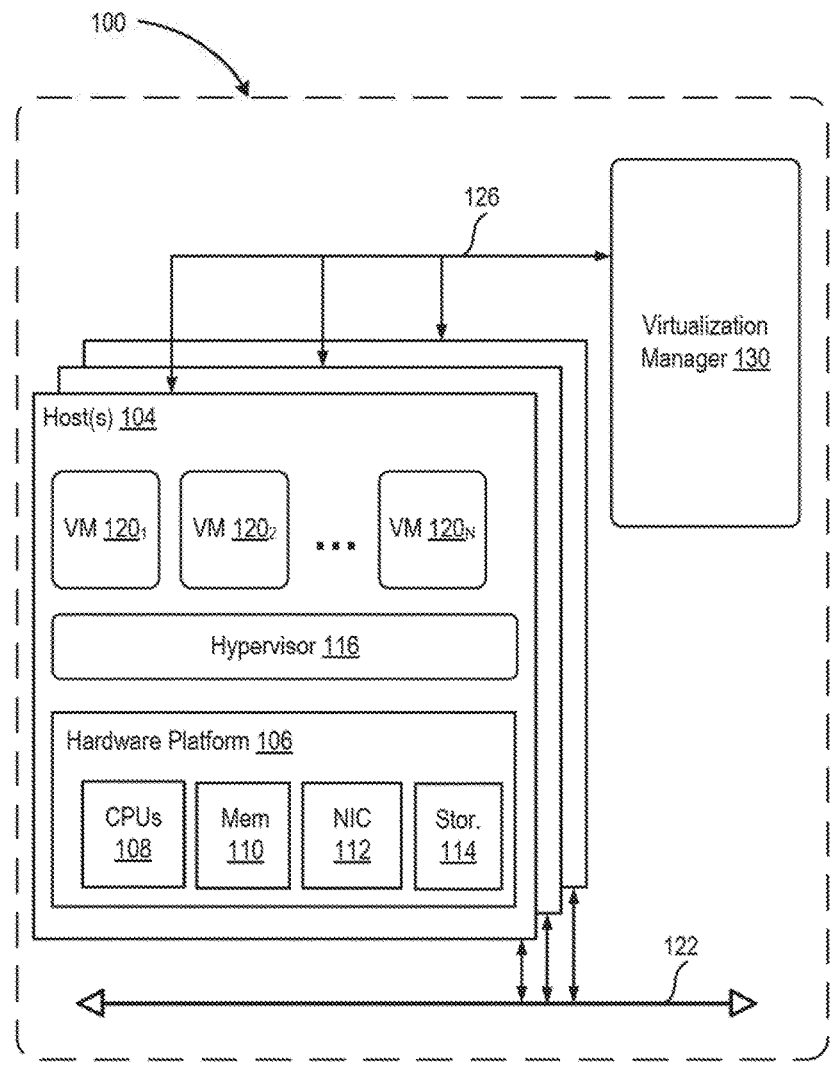
FIG. 1 is a block diagram that illustrates a computing system with which one or more embodiments of the present disclosure may be utilized.

FIG. 1 is a block diagram of a virtualized computing system 100 in which one or more embodiments of the present disclosure may be utilized. Virtualized computing system 100 is configured to provide a platform for managing and executing virtual workloads. The virtual workloads may be executed utilizing, for example, virtual machines (e.g., VMs 120). In one embodiment, virtualized computing system 100 may be a data center controlled and administrated by a particular enterprise or business organization.

Virtualized computing system 100 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other input/output ("I/O") devices such as, for example, a mouse and keyboard (not shown). Processor 108 is configured to execute instructions, for example, executable instructions that perform one or more operations described herein and may be stored in memory 110 and in storage 114. Note that processor 108 may include one or more cores, each of which may execute separate instruction flows. Memory 110 is a device allowing information, such as executable instructions, cryptographic keys, virtual disks, configurations, and other data, to be stored and retrieved. Memory 110 may include, for example, one or more random access memory (RAM) modules. Memory 110 may include RAM modules that are local to a first CPU and other RAM modules that are local to a second CPU. Network interface 112 enables a host 104 to communicate with another device, such as other hosts 104, via a communication medium, such as a network 122 within virtualized computing system 100. Network interface 112 may be one or more network adapters, also referred to as a Network Interface Card (NIC). Storage 114 represents local storage devices one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same host. VMs 120 run on top of a software interface layer, an example of which is a hypervisor 116, that enables sharing of the hardware resources of host 104 by VMs 120. One example of hypervisor 116 that may be used in an embodiment described herein is a VMware® ESXi™ hypervisor provided as part of the VMware vSphere® solution made commercially available from VMware, Inc of Palo Alto, Calif. Hypervisor 116 may run on top of the operating system of host 104 or directly on hardware components of host 104.

Virtualized computing system 100 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 100, or alternatively, running as a VM in one of hosts 104. One example of a virtualization management module is the VMware® vCenter™ Server product made available from VMware, Inc. Virtualization manager 130 is configured to carry out administrative tasks for computing system 100, including managing hosts 104, managing VMs 120 running within each host 104, provisioning VMs, migrating VMs from one host to another host, and load balancing between hosts 104.

Note that although virtualized computer system 100 is illustrated as executing a hypervisor 116 that manages virtual machines 120, alternative embodiments are contemplated to manage other virtual workloads such as containers, which are software constructs allowing processes to run with process-level isolation, are managed by a container manager within virtualized computer system 100. The container manager would manage the containers and would perform functions such as restarting, migrating, or shutting down containers. In one embodiment, the containers implement operating system-level virtualization, wherein an abstraction layer is provided on top of the kernel of an operating system on a host computer. Each container runs as an isolated process in userspace on the host operating system and shares the kernel with other containers.

Figure 2:
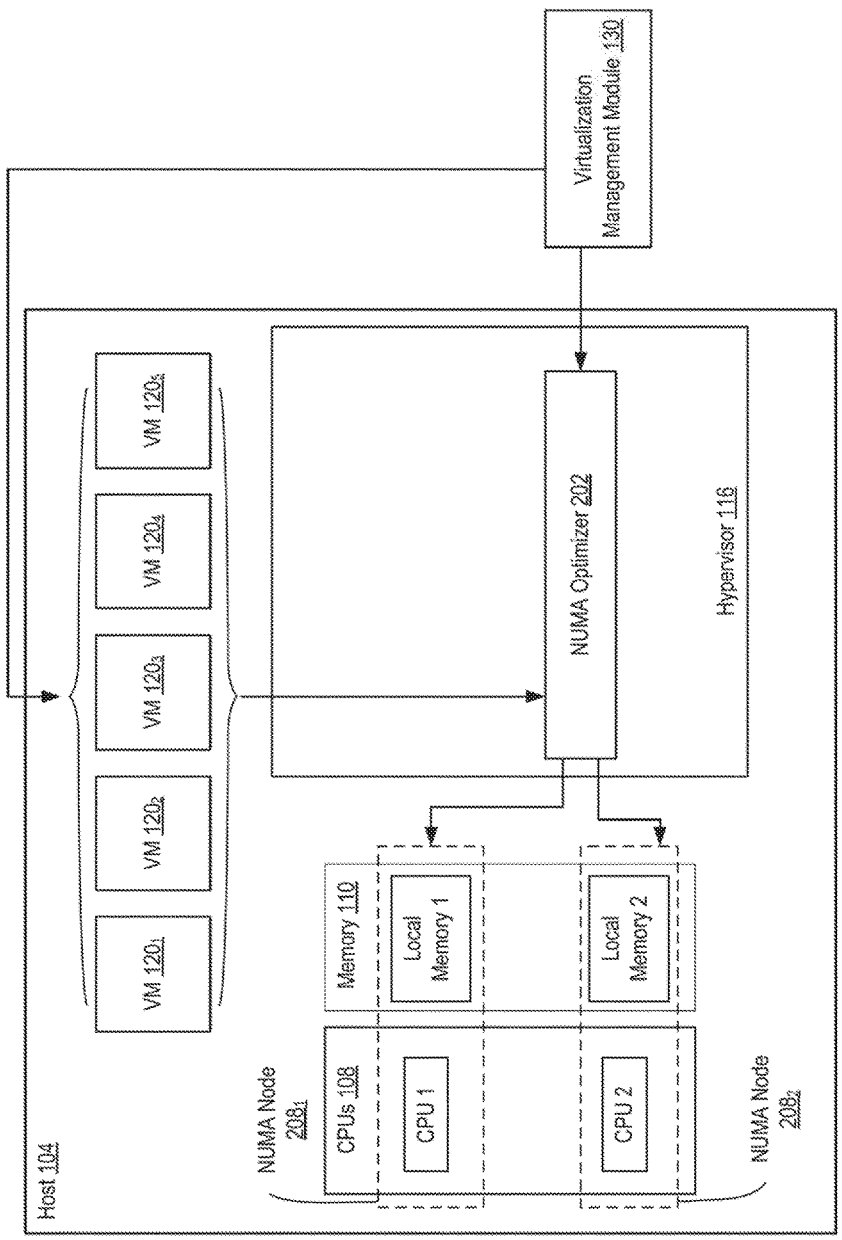
FIG. 2 is a block diagram illustrating a host of FIG. 1, according to an example.

FIG. 2 is a block diagram illustrating a host 104 of FIG. 1, according to an example. As described above, host 104 includes CPUs 108 and memory 110 that execute VMs 120 under the direction of hypervisor 116. Through techniques referred to herein as NUMA scheduling ("NUMA" stands for "non-uniform memory access"), VMs 120 are allocated for execution by different CPUs 108 of the host 104. A NUMA optimizer 202 performs various actions for rebalancing VMs 120 across CPUs 108. However, in some workflow-dependent circumstances, such optimizations may not be needed and in fact may result in a negative performance impact. Thus, NUMA optimizer 202 is configured to perform NUMA optimization techniques in a workflow-aware manner, as described in further detail below.

Note that herein, references to performing operations on VMs 120 may be interpreted as performing operations on VM worlds, which are subsets of work to be performed for a particular VM 120. More specifically, hypervisor 116 schedules VM "worlds" for execution, where each world is associated with a particular virtual CPU within a particular VM 120. For example, a VM 120 may include four virtual CPUs. Each virtual CPU would be scheduled as a "world" on a CPU 108 for execution. Operations described herein as scheduling and optimizing VMs may be interpreted to refer to operations performed on VM worlds, rather than on whole VMs. Thus, where VMs are described as being scheduled for execution, this may be interpreted to mean that one or more of the VM worlds for the VM is scheduled for execution. Each VM world for a particular VM may be independently optimizable. Note also that certain actions may affect an entire VM (such as shutting down the VM, restarting the VM, or the like) and thus those actions would affect all VM worlds for that VM.

To provide an understanding of the context in which workflow aware NUMA optimizations are performed, NUMA scheduling will now be described. CPUs 108 and memory 110 are organized into NUMA nodes 208. Each NUMA node 208 includes a particular CPU 108 as well as a particular local memory 110. Note that the term "CPU 108" used herein refers to a CPU socket and the physical processing device inserted in that socket, as opposed to a processing core or logical CPU.

Access to data stored in local memory of a particular NUMA node 208 is faster for the CPU 108 of that NUMA node 208, as compared with non-local CPUs 108 of other NUMA nodes 208. For example, CPU 1 is able to access local memory 1 more quickly (with fewer processing cycles) than CPU 1 is able to access local memory 2. Although not shown, individual NUMA nodes 208 are connected so that data may be transferred between them.

When a VM 120 is initialized for execution, hypervisor 116 assigns a "home node" for execution of that VM 120. A home node is a NUMA node 208 within host 104 that is designated to execute the VM. When memory is allocated to a VM 120, hypervisor 116 preferentially allocates the memory from the home node of the VM. If local memory is insufficient for the needs of a particular VM 120, hypervisor 116 may assign some non-local memory to that VM 120. In some embodiments, hypervisor 116 selects the home node considering CPU load and memory load across all NUMA nodes 208 within host 104.

A NUMA optimizer 202 performs NUMA optimization techniques to compensate for the changing computing resource needs of VMs 120 during execution. More specifically, NUMA optimizer 202 performs NUMA optimizations by checking a set of performance parameters and may migrate a VM 120 from one NUMA node 208 to another NUMA node 208 within host 104 based on those parameters. These NUMA optimizations may occur periodically, such as once every two seconds or with some other period. NUMA migration is accomplished for a particular VM 120 by changing the home node of that VM 120. This changes the CPU 108 in which the VM 120 executes because VMs 120 are only executed in their home node. In addition, when a VM 120 is migrated, NUMA optimizer 202 migrates data stored in local memory of the previous home node ("old local memory") to local memory of the now current home node ("new local memory"). In some embodiments, NUMA optimizer 202 migrates data from old local memory to new local memory slowly at first, ramping up speed over time, so that short term VM migrations do not incur too great of a performance penalty.

There are several triggers for NUMA migration of a VM 120. In some embodiments, if CPU load in one NUMA node 208 is significantly greater than CPU load at another NUMA node 208, NUMA optimizer 202 may trigger a NUMA migration for one or more VMs 120 in the NUMA node 208 with the high CPU load. In some embodiments, if a particular VM 120 utilizes large amounts of data stored in non-local memory within a particular NUMA node 208 that is not the home node for that VM 120, NUMA optimizer 202 may trigger a NUMA migration to migrate the VM to the NUMA node 208 for which the large amounts of data are accessed by that VM. This scenario might happen if a VM is migrated from one CPU 108 to another CPU 108 in response to a CPU load imbalance which is resolved shortly thereafter, but with most of the original data stored in the local memory of the original NUMA node.

In some embodiments, if frequent communication occurs between two VMs 120 in two different NUMA nodes 208, NUMA optimizer 202 may trigger a NUMA migration to cause both VMs 120 to execute on the same NUMA node. This particular trigger may contend with the CPU load-related trigger described above and if a high enough CPU load is experienced on a particular CPU, the CPU load-related trigger may override the trigger related to frequent communication. In that case, NUMA optimizer 202 may migrate two frequently-communicating VMs 120 to different NUMA nodes 208 despite the frequent communication.

In some embodiments, NUMA optimizer 202 performs NUMA migrations to maintain long term CPU utilization fairness. These migrations happen in the event that certain VMs 120 consistently get greater CPU time than certain other VMs 120. In one example, a first VM is scheduled for execution on a first NUMA node 208 and second and third VMs are scheduled for execution on a second NUMA node 208. Over the long run, the first VM receives more CPU time than the second and third VMs. NUMA optimizer 202 may migrate the VMs between the first and second NUMA nodes 208 to ensure a "fair" allocation of CPU time. For example, rather than the first VM receiving 100% of a CPU's time and the other two receiving 50% of a CPU's time each, each VM would receive 66% of a CPU.

Note that a particular embodiment of NUMA optimizer 202 may perform any combination of or all of the optimizations described above. Note also that in some embodiments, at least one VM 120 is not managed based on the NUMA scheduling techniques and NUMA optimization techniques described above.

Note further that NUMA migration is different from VM migration to a different host 104, an example of which is the VMware vSphere® vMotion® technique, developed by VMware, Inc., of Palo Alto, Calif. Specifically, while NUMA migration moves VMs 120 between NUMA nodes 208 in a single host 104, vMotion moves VMs 120 between different hosts 104.

There are instances in which NUMA optimizations may not produce a benefit. Specifically, when a particular VM will only be functioning in a particular host 104 for a short amount of time, NUMA optimizations may incur an overall performance hit due to optimizations having little no beneficial effect on the performance of the VM while incurring a performance cost related to the work required to perform the optimizations.

For this reason, NUMA optimizer 202 is "workflow aware" and adjusts its optimization operations based on the workflow that a particular VM 120 is executing. More specifically, as described above, virtualization management module 130 sometimes provides VM-related directives to hypervisor 116 to direct hypervisor 116 to take VM-related actions. These actions may include migrating a VM between hosts (again, this is contrasted with NUMA migration, which is migrating a VM within a host and between NUMA nodes 208), shutting down a VM and restarting a VM. Each of these actions results in the VM no longer executing within the host.

Because the above actions result in VMs no longer executing in a particular host 104 after some amount of time, NUMA optimizer 202 may refrain from performing certain optimizations on a particular VM 120 when NINA optimizer 202 receives an indication of an action terminating execution of the VM in the host 104. Herein, these actions are referred to as "work-flow aware-related trigger conditions" because these actions cause NUMA optimizer 202 to adjust optimization techniques in a workflow aware manner. As described above, actions terminating execution of the VM in the host 104 include migrating the VM to a different host, shutting down the VM, and restarting the VM. Note that migration between hosts may occur for many reasons. In one example, a technique referred to as VMware vSphere® Distributed Resource Scheduler™ ("vSphere DRS") aggregates hosts into clusters and may migrate VMs between hosts of the cluster. In another example, a technique referred to as VMware vSphere® Distributed Power Management™ ("vSphere DPM") functions in the context of hosts that are organized into clusters and may cause VMs to migrate away from a particular host so that the host can be shut down to save power. VMs may be migrated, shut down, or reboot automatically or manually (e.g., at the request of an administrator). VMs may be shut down and removed from a host in a cloud environment, when a lease for the VM expires. More specifically, tenants of a cloud environment utilize cloud resources of a cloud system and may be required to pay subscription fees to obtain a lease on such resources. Such a lease may have a limited term, and, upon expiration, may trigger VMs that are part of that lease to be shut down.

When one of the workflow aware-related trigger conditions occurs, NUMA optimizer 202 adjusts its optimization of the VM for which the trigger condition occurs using one or more of several workflow-aware optimization techniques (also referred to herein as "modified optimization operations" or "modified NUMA optimization operations"). NUMA optimizer 202 may determines that a workflow aware-related trigger condition occurs by detecting that because virtualization management module 130, which may cause such trigger conditions to occur, informs NUMA optimizer 202 that the trigger condition occurs. Note that after the trigger condition occurs, the VM may still be executing within host 104 for at least a short amount of time. For example, after a migration of a VM to a different host 104 is initiated, the VM that is to be migrated may still execute within host 104 for some time. Similarly, when a shutdown of a VM is initiated, that VM may still execute within host 104 for some time before being completely shut down.

In one workflow-aware optimization technique, referred to as the "no memory-migration technique," NUMA optimizer 202 performs migration of the VM between NUMA nodes 208 as described above, but does not perform memory migration. More specifically, NUMA optimizer 202 may change the home node of the VM such that the VM will migrate to a different NUMA node 208. However, subsequent to changing the home node, NUMA optimizer 202 does not migrate any data for the migrated VM from the original home node to the new home node. The cost of migrating memory in this manner is deemed to be too high compared to the benefit gained for the short amount of time in which the VM will remain executing within the host 104.

In another technique, referred to as the "no calculation technique," NUMA optimizer 202 does not perform one or more calculations for determining whether and how to perform NUMA optimizations for a VM. These calculations may include any of a CPU load balancing calculation, a fairness calculation, calculations related to how much data for the VM under analysis is stored in any particular non-local memory (i.e., a memory local to a NUMA node 208 that the VM is not currently executing in), and calculations used for determining whether memory migration is required. In some embodiments, NUMA optimizer 202 refrains from performing one or more of the optimization related calculations. In other embodiments, NUMA optimizer 202 refrains from performing all of the optimization related calculations. In further embodiments, NUMA optimizer 202 performs no calculations at all related to determining how or whether to perform NUMA optimization for the VM for which the workflow aware-related trigger condition occurs.

The CPU load balancing calculation is a calculation whereby NUMA optimizer 202 determines the CPU load for the VM at its current NUMA node 208 and compares that CPU load to the CPU load for other NUMA nodes 208. The fairness calculation is the determination for the maintenance of long term fairness described above. Specifically, these calculations determine, over a relatively long period of time, how much CPU time each VM is being allocated. As described above, the purpose of this calculation is to determine whether VMs should be migrated to maintain a "fair" allocation of CPU time.

The calculations related to how much data for the VM under analysis is stored in any particular non-local memory is made to determine whether to migrate the CPU. Such calculation would compare the amount of data for the VM in its home node with the amount of data for the VM in non-home nodes in order to determine whether to migrate the VM to achieve greater data locality. The calculations for determining whether memory migration should happen compares the amount of data that is stored in non-local memory with the amount of data that is stored in local memory for the purpose of determining whether to migrate data from non-home nodes to the home node.

In the no-calculation technique, NUMA optimizer 202 does not perform one or more of these above calculations for the VM for which a workflow aware-related trigger condition has been met. Note that NUMA optimizer 202 does perform these calculations for VMs for which the workflow aware-related trigger condition has not been met. In other words, for VMs that are not about to be shut down, restarted, migrated, or are otherwise about to terminate execution in the current host, the above calculations are performed, while for VMs that do meet the workflow aware-related trigger condition, when the no-calculation technique is used, at least one or more of the calculations performed for the VMs that are not about to terminate execution in the current host is not performed for the VM that meets the workflow aware-related trigger condition.

In another technique, referred to as the "no optimization technique," NUMA optimizer 202 performs no optimization for the VM for which the workflow aware-related trigger is met. In other words, no calculations are performed, no inter-node VM migration is performed, and no memory migration is performed. The VM remains at its current NUMA node 208 and the data for that VM remains at their current location. Note that NUMA optimizer 202 still performs optimizations for other VMs in the no optimization technique.

Note that the above techniques may be applied to a configuration in which containers not including a guest operating system (so-called "OS-less containers" (see, e.g., www.linuxcontainers.org, www.docker.com)) execute processes. One example of such a configuration is a computer system running the Linux operating system and executing the "LXC" software. LXC provides process-level isolation, allowing processes to execute in isolated "containers." NUMA scheduling and optimization is provided by a Linux kernel in a similar manner as hypervisor 116 of FIGS. 1 and 2. Docker is another example of a container manager that provides process-level isolation, managing containers in which isolated processes run.

Figure 3:
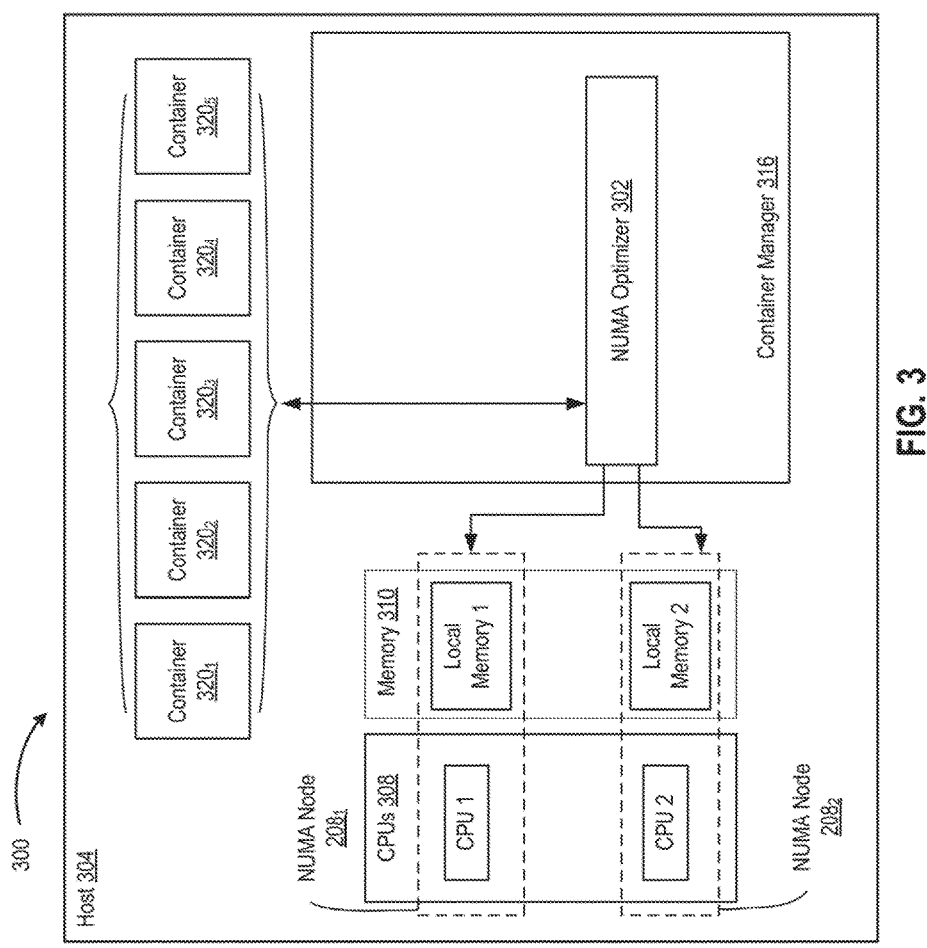
FIG. 3 is a block diagram of a container system including a host computer, according to an example.

FIG. 3 is a block diagram of a container system 300 including a host computer 304, according to an example. The host computer executes a container manager 316, which can be, for example, a Docker container manager or an LXC container manager, or other containers managers. Operating system kernel 301 includes a container manager 316 and a NUMA optimizer 302 which performs similar functionality as NUMA optimizer 202 of FIG. 2. More specifically, NUMA optimizer 302 controls execution of containers 320 on various NUMA nodes 208 of host 304, performing optimizations by migrating containers 320 and data between NUMA nodes 208 as specified herein. NUMA optimizer 302 performs optimizations in a workflow-aware manner. Thus, NUMA optimizer 302 migrates containers 320 and data stored in memory 310 between NUMA nodes as specified by optimization parameters and when containers 320 are to stop executing within host computer 304 (e.g., due to being migrated, shut down, restarted, or the like), NUMA optimizer 302 decides to perform one or more of the workflow-aware optimization techniques described above (e.g., migrating only the container but not memory for that container, not performing optimization calculations for the container, or not performing any optimizations for the container).

Figure 4:
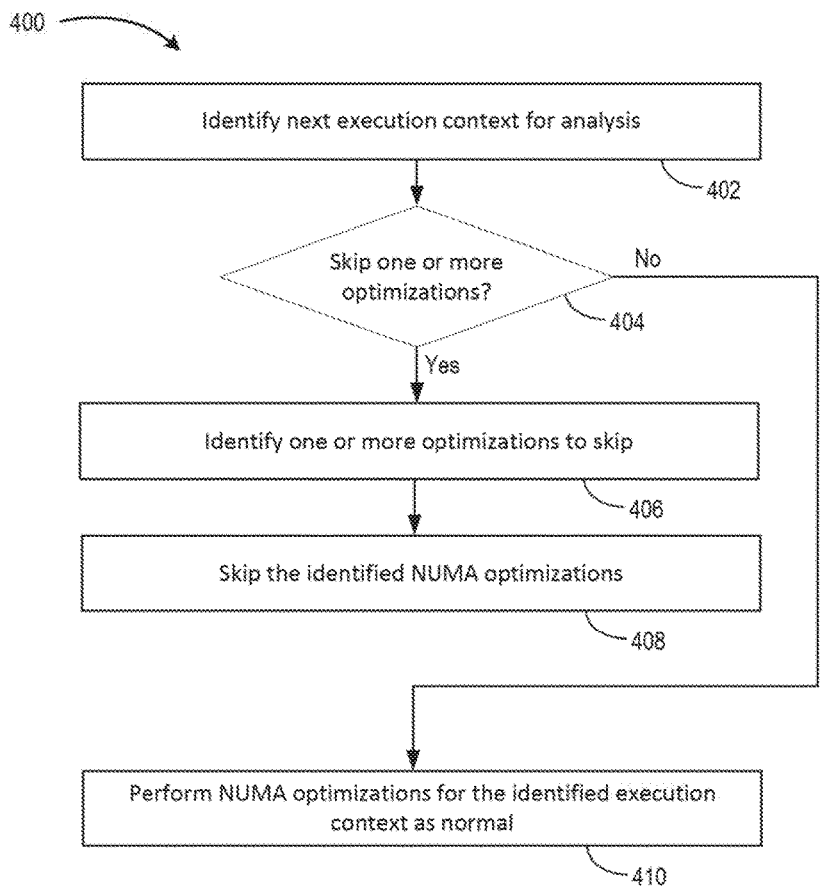
FIG. 4 is a flow diagram of a method for performing workflow-aware NUMA optimization, according to an example.

FIG. 4 is a flow diagram of a method 400 for performing workflow-aware NUMA optimization, according to an example. Although described with respect to the systems of FIGS. 1-3, those of skill in the art will understand that any system configured to perform the steps of method 400, in various technically feasible orders, falls in the scope of the present disclosure. Note that in the following description of method 400, the term "execution context" may mean a VM, such as those shown in FIG. 1-2 (or VM world) or a container, such as those shown in FIG. 3, or may mean other execution contexts.

As shown, method 400 begins at step 402, where a NUMA optimizer (e.g., NUMA optimizer 202 or NUMA optimizer 302) identifies a next execution context VM or container) for analysis. While other technically feasible embodiments are of course possible, in some embodiments, the NUMA optimizer maintains or examines a queue of execution contexts that are ready for optimization analysis. Such a queue would include an indication of each execution context executing in a host (e.g., host 104 or host 304). Execution contexts may be ordered in any manner in the queue. In some embodiments, execution contexts are ordered by time since last optimization analysis. For example, an execution context that was analyzed 1 second ago would come before another execution context that was analyzed 1.5 seconds ago. In such embodiments, NUMA optimizer may periodically perform NUMA optimizations on the execution contexts. Identification of the next execution context for analysis would comprise identifying an execution context for which the time since last optimization exceeds the optimization period.

At step 404, the NUMA optimizer determines whether one or more NUMA optimizations are to be skipped for the identified execution context. In embodiments where the execution context is a VM, NUMA optimizations may be skipped if virtualization management module 130 transmits an indication to NUMA optimizer 202 that the VM is to be stopped, restarted, or migrated between hosts 104. In embodiments where the execution context is a container, NUMA optimizations may be skipped if container manager 316 indicates that the container is to be stopped, restarted, migrated, or is to otherwise stop execution in host 304. If NUMA optimizations are to be skipped, then method 400 proceeds to step 406 and if NUMA optimizations are not to be skipped, then method 400 proceeds to step 410.

At step 406, the NUMA optimizer selects one or more optimizations to skip. The selections may be based on various factors including characteristics of the workload. For example, a "missing critical workload" may use a no memory migration technique, where "mission critical" means that fast execution time and/or real-time execution is important. A "less CPU intensive workload" may use the "no calculation technique," such that calculation for CPU load balancing, for CPU fairness, or memory calculation is not performed. "A less intensive CPU intensive workload" is a workload where CPU execution time is not critical and/or where CPU cycle usage is lower than the CPU intensive workloads. Workloads for testing or development may use a no optimization technique.

At step 408, the NUMA optimizer performs NUMA optimizations on the identified execution context, but skips the identified NUMA optimizations. One example of a way to skip NUMA optimizations may include migrating the execution context from one NUMA node to another NUMA node but not performing any memory migrations for the remaining life of the execution context (the "no memory migration technique"). Another example of a way to skip NUMA optimizations may alternatively include performing no optimization-related calculations for the identified execution context (the "no calculation technique"). Examples of calculations that may be skipped are calculations for CPU load balancing, fairness calculations, and calculations related to comparing the amount of data stored in memory local to the execution context with data stored in memory that is not local to the execution context. Each of these is described above with respect to FIG. 2. A further example of a way to skip NUMA optimizations it to simply perform no optimizations for the identified execution context. Note that in any of the situations described with respect to step 408, optimizations are still performed for other execution contexts.

At step 410, if NUMA optimizations are not to be skipped, then the NUMA optimizer simply performs the standard set of NUMA optimizations for the execution context, meaning that NUMA optimizations are not skipped as described with respect to step 408.

Note that method 400 shows analysis for one execution context. A NUMA optimizer may repeatedly perform method 400, analyzing one or more (or all) execution contexts executing in a host machine. Note that some execution contexts executing in the host machine may be designated as not being subject to NUMA optimizations and thus may not be subject to method 400.

Note that although specific configurations of components are described (e.g., hypervisor 116 and NUMA optimizer 202 are shown separately and NUMA optimizer 302 and container manager 316 are shown separately), persons of skill in the art will understand that these configurations are not limiting. Functions performed by one component may instead be performed by another. For example, though some actions are described as being performed by a NUMA optimizer, persons of skill in the art will understand that those actions may be performed by a hypervisor 116 or an operating system kernel on which container manager 316 is running, instead.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. As used herein, the term "container" refers generically to both virtual machines and OS-less containers.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for managing execution contexts in a non-uniform memory access (NUMA) architecture, the method comprising:
    identifying a first execution context for optimization analysis;
    determining that no workflow aware-related trigger condition of a set of workflow aware-related trigger conditions has occurred for the first execution context;
    performing a NUMA optimization operation for the first execution context;
    identifying a second execution context for optimization analysis;
    determining that a workflow aware-related trigger condition of the set of workflow aware-related trigger conditions has occurred for the second execution context; and
    responsive to determining that the workflow aware-related trigger condition has occurred, performing a modified NUMA optimization operation for the second execution context,
    wherein the NUMA optimization operation includes at least one operation not included in the modified NUMA optimization operation, and further wherein:
    (1) the NUMA optimization operation includes (a) migrating the first execution context from a first NUMA node of the NUMA architecture to a second NUMA node of the NUMA architecture, or (b) migrating first data associated with the first execution context from the first NUMA node to the second NUMA node; or
    (2) the modified NUMA optimization operation includes migrating the second execution context from a first NUMA node of the NUMA architecture to a second NUMA node of the NUMA architecture, but does not include migrating first data associated with the second execution context from the first NUMA node to the second NUMA node.

2. The method of claim 1, wherein the set of workflow aware-related trigger conditions includes:
    migrating an execution context between hosts,
    stopping an execution context,
    restarting an execution context, and
    suspending an execution context.

3. The method of claim 1, wherein the execution context comprises:
    one of a virtual machine and a container.

4. The method of claim 1, wherein the NUMA optimization operation includes:
    migrating the first execution context from a first NUMA node of the NUMA architecture to a second NUMA node of the NUMA architecture, or
    migrating first data associated with the first execution context from the first NUMA node to the second NUMA node.

5. The method of claim 1, wherein:
    the modified NUMA optimization operation includes migrating the second execution context from a first NUMA node of the NUMA architecture to a second NUMA node of the NUMA architecture, but does not include migrating first data associated with the second execution context from the first NUMA node to the second NUMA node.

6. The method of claim 1, wherein:
    the NUMA optimization operation includes performing at least one optimization-related calculation associated with CPU load and at least one optimization-related calculation associated with memory locality.

7. The method of claim 6, wherein the optimization-related calculation includes:
    one of a CPU load balancing calculation, a fairness calculation, a calculation related to determine how much data is stored in non-local memory, and a calculation related to determining whether memory migration is to be performed.

8. The method of claim 1, wherein the modified NUMA optimization operation includes performing no calculations associated with CPU load or memory locality.

9. The method of claim 1, wherein the modified NUMA optimization operation includes performing no NUMA optimization operations for the second execution context.

10. A system for managing execution contexts in a non-uniform memory access (NUMA) architecture, the system comprising:
    a host;
    a first NUMA node included in the host; and
    a second NUMA node included in the host, wherein the host is configured to:
  identify a first execution context for optimization analysis;
  determine that no workflow aware-related trigger condition of a set of workflow aware-related trigger conditions has occurred for the first execution context;
  perform a NUMA optimization operation for the first execution context;
  identify a second execution context for optimization analysis;
  determine that a workflow aware-related trigger condition of the set of workflow aware-related trigger conditions has occurred for the second execution context; and
  responsive to determining that the workflow aware-related trigger condition has occurred, perform a modified NUMA optimization operation for the second execution context,
  wherein the NUMA optimization operation includes at least one operation not included in the modified NUMA optimization operation, and
  wherein both the NUMA optimization operation and the modified NUMA optimization operation comprise operations associated with execution of execution contexts on the first NUMA node or the second NUMA node, and further wherein:
    (1) the NUMA optimization operation includes (a) migrating the first execution context from a first NUMA node of the NUMA architecture to a second NUMA node of the NUMA architecture, or (b) migrating first data associated with the first execution context from the first NUMA node to the second NUMA node; or
    (2) the modified NUMA optimization operation includes migrating the second execution context from a first NUMA node of the NUMA architecture to a second NUMA node of the NUMA architecture, but does not include migrating first data associated with the second execution context from the first NUMA node to the second NUMA node.

11. The system of claim 10, wherein the set of workflow aware-related trigger conditions includes:
  migrating an execution context between hosts,
  stopping an execution context,
  restarting an execution context, and
  suspending an execution context.

12. The system of claim 10, wherein the execution context comprises:
  one of a virtual machine and a container.

13. The system of claim 10, wherein the NUMA optimization operation includes:
  migrating the first execution context from the first NUMA node to the second NUMA node, or
  migrating first data associated with the first execution context from the first NUMA node to the second NUMA node.

14. The system of claim 10, wherein:
  the modified NUMA optimization operation includes migrating the second execution context from the first NUMA node to the second NUMA node, but does not include migrating first data associated with the second execution context from the first NUMA node to the second NUMA node.

15. The system of claim 10, wherein:
  the NUMA optimization operation includes performing at least one optimization-related calculation associated with CPU load and at least one optimization-related calculation associated with memory locality.

16. The system of claim 15, wherein the optimization-related calculation includes:
  one of a CPU load balancing calculation, a fairness calculation, a calculation related to determine how much data is stored in non-local memory, and a calculation related to determining whether memory migration is to be performed.

17. The system of claim 10, wherein the modified NUMA optimization operation includes performing no calculations associated with CPU load or memory locality.

18. The system of claim 10, wherein the modified NUMA optimization operation includes performing no NUMA optimization operations for the second execution context.

19. A non-transitory computer-readable medium storing instructions that, when executed by a processor, cause the processor to perform a method for managing execution contexts in a non-uniform memory access (NUMA) architecture, the method comprising:
  identifying a first execution context for optimization analysis;
  determining that no workflow aware-related trigger condition of a set of workflow aware-related trigger conditions has occurred for the first execution context;
  performing a NUMA optimization operation for the first execution context;
  identifying a second execution context for optimization analysis;
  determining that a workflow aware-related trigger condition of the set of workflow aware-related trigger conditions has occurred for the second execution context; and
  responsive to determining that the workflow aware-related trigger condition has occurred, performing a modified NUMA optimization operation for the second execution context,
  wherein the NUMA optimization operation includes at least one operation not included in the modified NUMA optimization operation, and further wherein:
    (1) the NUMA optimization operation includes (a) migrating the first execution context from a first NUMA node of the NUMA architecture to a second NUMA node of the NUMA architecture, or (b) migrating first data associated with the first execution context from the first NUMA node to the second NUMA node; or
    (2) the modified NUMA optimization operation includes migrating the second execution context from a first NUMA node of the NUMA architecture to a second NUMA node of the NUMA architecture, but does not include migrating first data associated with the second execution context from the first NUMA node to the second NUMA node.

20. The non-transitory computer-readable medium of claim 19, wherein the set of workflow aware-related trigger conditions includes:
  migrating an execution context between hosts,
  stopping an execution context,
  restarting an execution context, and
  suspending an execution context.

* * * * *